United States Patent

[11] 3,542,239

[72] Inventors Aale Latvala
Ann Arbor;
Myron A. Selden, Dearborn Heights;
Benjamin T. Howes, Birmingham,
Michigan
[21] Appl. No. 784,764
[22] Filed Dec. 18, 1968
[45] Patented Nov. 24, 1970
[73] Assignee Ford Motor Company
Dearborn, Michigan
a corporation of Delaware

[54] FUEL TANK VAPOR SEPARATOR SYSTEM
15 Claims, 2 Drawing Figs.

[52] U.S. Cl. .................................................. 220/85
[51] Int. Cl. .................................................. B65d 25/00
[50] Field of Search .......................................... 220/85, 85-
V.R., 85-V.S., 85-S, 86, 44, 88-B; 62/45; 123/136

[56] References Cited
UNITED STATES PATENTS

| 1,516,358 | 11/1924 | Thomas | 220/85-V.R. |
| 2,944,405 | 7/1960 | Basore et al. | 220/85-V.S. |
| 3,187,935 | 6/1965 | Lense | 220/86 |

*Primary Examiner*—Raphael H. Schwartz
*Attorney*—John R. Faulkner and Glenn S. Arendsen ABSTRACT: A container is mounted at each end of one side of the fuel tank. Conduits connect the inside of the front container with the upper rear corners of the fuel tank and similar conduits connect the inside of the rear container with the upper front corners of the fuel tank. The conduits connecting the near side of the tank to each container extend into the upper portion of the container while the conduits connecting the far side terminate near the bottom of the container. A tube connects the upper portion of each container with a vapor storage means.

INVENTORS
AALE M. LATVALA
MYRON A. SEIDEN
BY BENJAMIN T. HOWES
ATTORNEYS

FUEL TANK VAPOR SEPARATOR SYSTEM

SUMMARY OF THE INVENTION

Evaporation losses from vehicle fuel tanks contribute in some undetermined degree to the contamination of the atmosphere and various systems have been proposed for burning in the vehicle engine fuel vapors formed above the liquid fuel in the fuel tank. Many of these systems use an absorbent to contain those fuel vapors formed while the vehicle engine is not operating.

The presence of even very small amounts of liquid fuel in these vapor systems interfere significantly with the engine combustion process and with the storage system. Vapor separators capable of removing all liquid fuel from the vapors formed above the liquid fuel in the fuel tank for all anticipated attitudes of the fuel tank therefore are an essential part of such systems.

This invention provides a system made up of relatively inexpensive components that removes the vapor from the fuel tank, separates the vapor from any liquid fuel, and returns the liquid fuel to the tank for all anticipated fuel tank attitudes. The system comprises a substantially upright container located adjacent one side of the tank above the maximum possible fuel level. A conduit connects the upper portion of the container with the near side of the tank and a second conduit connects the lower portion of the container with the far side of the tank. Both conduits terminate inside the tank adjacent the upper tank surface. A pair of containers are preferred for a fuel tank having a relatively square upper surface. One container then is located at each end of any one side of the tank.

Improved ability to remove vapor from the tank regardless of the tank attitude is achieved by connecting the front container with the upper rear corners of the tank and connecting the rear container with the upper front corners of the tank. The conduits connecting each container with the near side of the tank extend into the upper portion of the container while the conduits from the far side of the tank terminate in the lower portions. Regardless of tank attitude within anticipated limits, at least one of the containers communicates with the vapor space above the liquid fuel. Vapor is drawn into that container and any liquid fuel carried with the vapor is separated therefrom. The vapors are carried to the engine and the separated liquid returns to the tank via the conduit terminating in the lower portion of the container.

DETAILED DESCRIPTION

Figure 1:
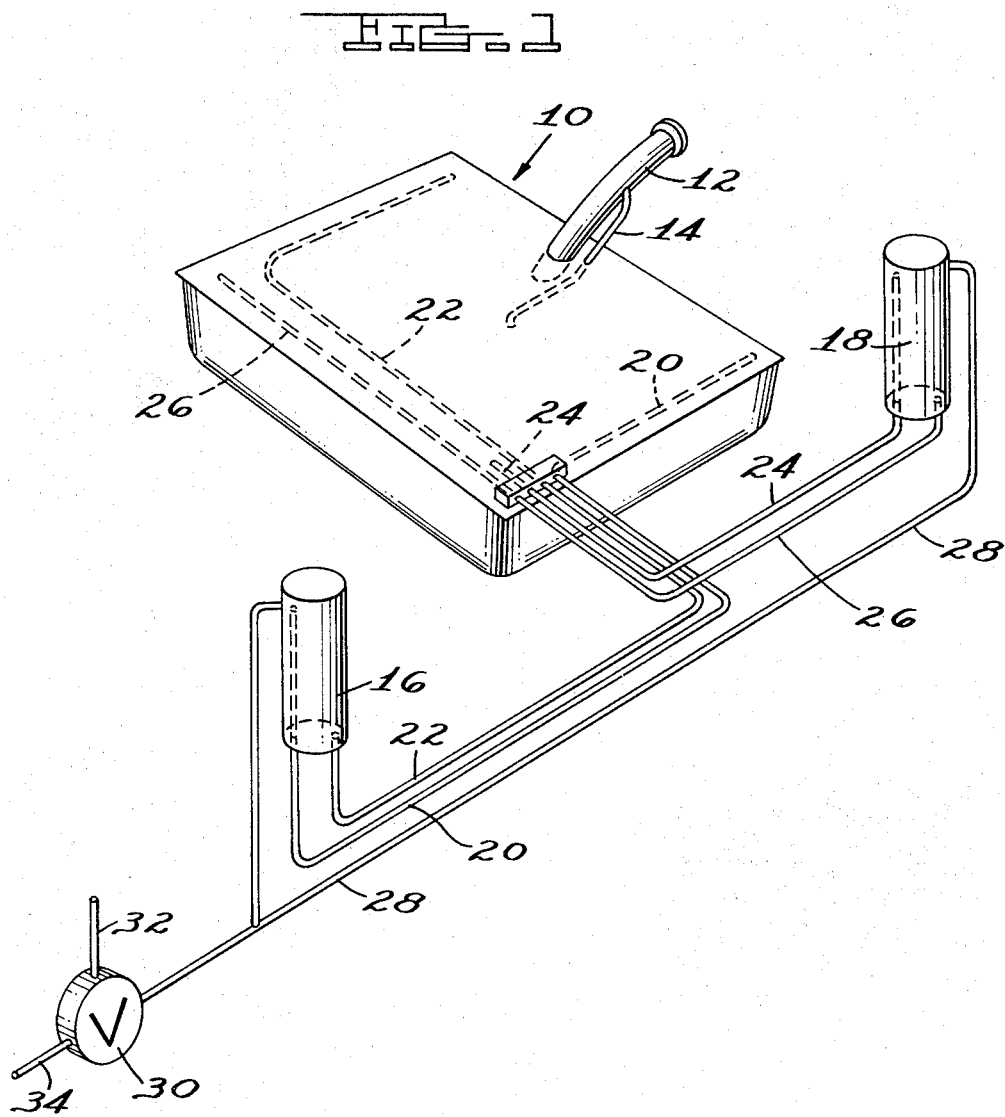
FIG. 1 is a schematic presentation of the system of this invention showing the dual containers and the conduits connecting the containers to the four upper corners of the fuel tank.

A substantially rectangular fuel tank is represented in the drawings by numeral 10. Tank 10 has a filler neck 12 projecting from the approximate center of the upper surface adjacent its rear edge. Neck 12 projects a short distance below the top of tank 10 and a vent tube 14 communicates with neck 12 at a point above the lower end of the neck and extends into the approximate center of the tank. Tube 14 turns downward at the approximate center of the tank and terminates a short distance below the top of the tank.

Respective front and rear containers 16 and 18 are mounted along one side of tank 10. Containers 16 and 18 have an elongated shape and are mounted with the bottom surfaces above the top of tank 10. The elongated dimension of the containers projects vertically above tank 10.

A conduit 20 connects the upper portion of front container 16 with the upper rear corner of tank 10 on the side of the tank adjacent the container. A second conduit 22 connects the lower portion of container 16 with the upper rear corner of tank 10 on the opposite side. Similarly, a conduit 24 connects the upper portion of rear container 18 with the upper front corner of tank 10 on the near side and a conduit 26 connects the lower portion of container 18 with the upper front corner of tank 10 on the far side.

A tube 28 connects the upper portions of containers 16 and 18 to a valve mechanism 30. Valve mechanism 30 contains three check valves (not shown), two connecting tube 28 with the atmosphere through tube 32 and the third connecting tube 28 with a tube 34 that communicates with vapor storing and consuming devices (not shown). One of the valves connecting tube 28 with tube 32 opens to admit atmospheric air into tube 28 if a partial vacuum develops within tank 10 and the other acts as an emergency outlet to vent tank 10 to atmosphere when tank pressure exceeds about .7 to 1.2 p.s.i. The valve connecting tube 28 with tube 34 passes fuel vapors from tube 28 to tube 34 when the tank pressure exceeds about 0.3 to 0.5 p.s.i.

Figure 2:
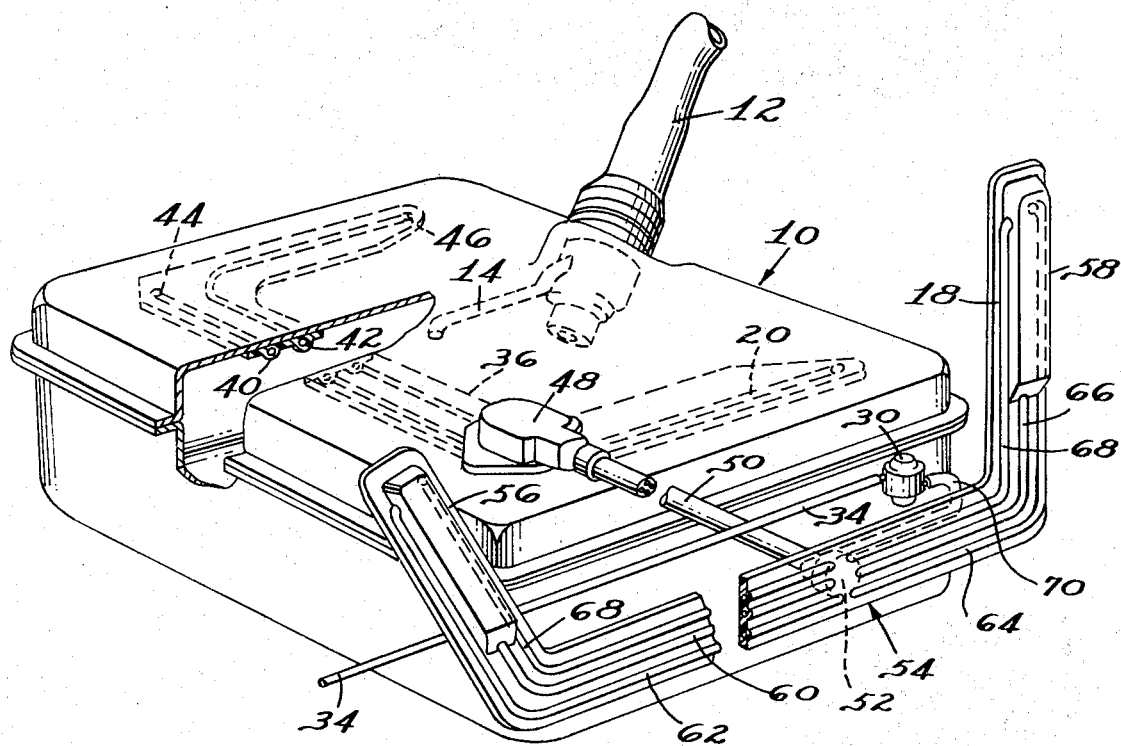
FIG. 2 shows an actual structural installation of the system. The two containers are included in a single component molded from polymeric material and a C-shaped member also molded from a polymeric material fits against the roof of the fuel tank where it forms the conduits.

As shown in FIG. 2, the portions of conduits 20, 22, 24 and 26 can be located in a C-shaped molding 36 mounted on the upper inside surface of the fuel tank. Molding 36 can be made from any polymeric material such as polyethylene and is bonded, riveted or otherwise fastened to the upper inside surface of tank 10 prior to assembly of the tank portions to each other. Passages such as those represented by the numerals 40 and 42 terminate at appropriate vent holes such as those represented by numerals 44 and 46 to make up the appropriate conduits. A connecter formed integrally with molding 36 projects sealingly through the top of tank 10 where it engages an external connecter 48. A bundle 50 of tubes connect the individual passages in molding 36 with a connecter 52 formed integrally with a U-shaped molding 54 positioned adjacent the fuel tank.

Molding 54 can also be made from a polymeric material such a polyethylene. Expanded portions 56 and 58 are formed in the respective front and rear legs of molding 54 where the portions serve as the respective front and rear containers. Passages 60 and 62 formed in molding 54 serve as portions of conduits 20 and 22 to connect the front expanded portion 56 to the upper rear vents of molding 36 and similar passages 64 and 66 serve as portions of conduits 24 and 26 to connect the rear expanded portion 58 with the front vents of molding 36. A third passage 68 formed integrally in molding 54 connects the upper spaces of expanded portions 56 and 58 with connecter 52. Tube 70 attached to connecter 52 communicates with passage 68 and connects the passage to valve mechanism 30.

The fuel supply in tank 10 is replenished in the conventional manner through filler neck 12. When the fuel level rises above the opening of filler neck 12 inside the tank and the opening of vent tube 14, the tank refuses additional fuel and thereby preserves a small vapor space near the top surface.

With the tank in a horizontal position, each conduit 20–26 connects the vapor space above the fuel with containers 16 and 18. Vapors are drawn off the tank and consumed in the engine or stored in appropriate storage mechanisms for later consumption. If the vehicle now acquires a downhill attitude, the fuel in the tank covers the inlets of conduits 24 and 26. Conduits 20 and 22 continue to communicate with the vapor space, however, and the vapor is drawn off through front container 16. Similarly, if the vehicle acquires an uphill attitude, fuel vapors are removed via rear container 18.

When the vehicle acquires a sidehill attitude with the far side of tank 10 positioned below the near side, the ends of conduits 22 and 26 are blocked by liquid fuel. Vapor then is removed via conduits 20 and 24 through both containers. In the opposite attitude with the near side of tank 10 low, vapors are removed via conduits 22 and 26. Conduits 20 and 24 can fill partially with liquid fuel, but since these conduits extend into the upper portions of the containers, no liquid fuel reaches the containers. Any liquid entrained in or condensed from the vapors reaching the containers settles at the bottoms thereof and returns to the tank via conduits 22 or 26 when tank attitude changes. If the tank acquires a diagonal attitude with one corner low and the conduits at that corner and the corners of the opposite diagonal are covered by liquid fuel, vapors nevertheless are removed via the conduit opening at the highest corner.

In actual vehicle operation, tank attitude varies rapidly and considerable fuel sloshing occurs. A conduit that has filled with liquid fuel may be required to vent the air space in a new attitude acquired too rapidly to permit draining the fuel back into the tank. Connecting the containers as described permits clearing the conduits without generating an excessive pressure in the tank that might force large quantities of liquid fuel into a container via a submerged conduit.

For example, suppose the tank is in a downhill attitude with the tank openings of conduits 24 and 26 submerged in liquid fuel and portions of these conduits filled with liquid fuel. A sudden shift in tank attitude lowering the rear adjacent tank corner submerges the inlets of conduits 20, 22 and 24, leaving conduit 26 to perform the venting. Since the opening of conduit 26 in rear container 18 is at a low position relative to the conduit opening in the tank, liquid fuel trapped in the conduit flows into the container 18. The small amount of liquid fuel from the conduit can cover the bottom of container 18, but the pressure in tank 10 necessary to force vapor through the layer of liquid fuel is much less than the amount of pressure that would have liquid fuel through conduit 24. Containers 16 and 18 preferably have a cross-sectional area exceeding about 20 times the cross-sectional area of each conduit to insure a small liquid layer. Note also the container 16 is above the fuel level in the tank and does not fill with liquid fuel.

With appropriate reconnections of the conduits, the containers can be located along any side of the tank including the front or rear sides. Additionally, one container can be mounted diagonally across the tank from the other, or a container can be mounted at each corner of the tank. In the latter arrangement, each container is connected to the diagonally opposite corner of the fuel tank.

Only one container is needed with a fuel tank having a relatively narrow upper surface. The single container is mounted adjacent the approximate center of the shorter side of the tank. One conduit connects the lower tank portion of the container to the far side of the tank and a second conduit connects the upper portion of the container to the near side of the tank.

The minimum opening pressure of the check valve in valve mechanism 30 connecting tube 28 with tube 34 is selected to prevent tank venting through the valve during fuel replenishment. Such venting would eliminate the minimum vapor space required above the fuel level in the tank to prevent forcing liquid fuel through valve mechanism 30. To insure that no extra fuel can be forced into the tank, the valve is set to open at a pressure differential just above the pressure head generated by a column of fuel equaling the height of fuel in the filler neck. Valve mechanism 30 thus performs the multiple junctions of venting air into tank 10 in case a partial vacuum develops in the tank, venting the tank to atmospheric if a hazardous pressure develops within the tank, preventing backflow from the storage or consuming systems to the tank, and preventing overfilling of the tank.

Thus this invention provides a system for removing vapors from a fuel tank movable into a variety of attitudes and for separating any liquid from the vapors. Major components of the system can be manufactured from molded polymeric materials at high production rates.

We claim:

1. A system for removing vapors from a tank movable into varying attitudes comprising substantially upright container means located adjacent one side of the tank above the maximum possible level in the tank, said container means including a front container means located adjacent the front of the tank and a rear container means located adjacent the rear of the tank, and conduit means connecting the container means with the tank interior adjacent the upper surface of the tank, said conduit means connecting the upper portions of the container means with the near side of the tank and the lower portions of the container means with the far side of the tank, said conduit means connecting the front upper corners of the tank with the rear container means and connecting the rear upper corners of the tank with the front container means.

2. The system of claim 1 in which both container means are located at one side of the tank, the conduit means connecting each container means with the near side of the tank extending into the upper portions of the respective container means, and the conduit means connecting each container means with the far side of the tank extending into the lower portions of the respective container means.

3. The system of claim 2 in which the conduit means comprises a relatively flat insert located at the roof of the tank, said insert being made of a polymeric material and containing individual conduits opening at each corner of the tank.

4. The system of claim 3 comprising a valve means connected to the upper portions of the container means, said valve means including a first check valve permitting atmospheric air to enter the container means but preventing vapors from escaping to the atmosphere, and a second check valve permitting vapor flow from the container means but preventing flow into the container means.

5. The system of claim 4 comprising means for always maintaining a small vapor space in the tank above the level of any liquid therein.

6. The system of claim 5 comprising a filler neck for the tank that extends into the tank a short distance below the tank top surface, and a tube extending into the center portion of the tank, said tube terminating a short distance below the tank top surface, said tube communicating with the filler neck at a point remote from the filler neck lower end, said tube and filler neck combining to prevent filling the tank completely.

7. The system of claim 6 in which the check valve permitting vapor flow from the container means is set to open at a pressure differential exceeding the pressure head generated by a column of liquid equaling the height of liquid in said filler neck.

8. The system of claim 1 in which the conduit means connecting each container means with the near side of the tank extend into the upper portions of the respective container means, and the conduit means connecting each container means with the far side of the tank extend into the lower portions of the respective container means.

9. The system of claim 1 comprising a valve means connected to the upper portions of the container means, said valve means including a first check valve permitting atmospheric air to enter the container means but preventing vapors from escaping to the atmosphere, and a second check valve permitting vapor flow from the container means but preventing flow into the container means.

10. The system of claim 1 comprising means for always maintaining a small vapor space in the tank above the level of any liquid therein.

11. The system of claim 1 comprising a filler neck for the tank that extends into the tank a short distance below the tank top surface, and a tube extending into the center portion of the tank, said tube terminating a short distance below the tank top surface, said tube communicating with the filler neck at a point remote from the filler neck lower end, said tube and filler neck combining to prevent filling the tank completely.

12. The system of claim 1 in which the check valve permitting vapor flow from the container means is set to open at a pressure differential exceeding the pressure head generated by a column of liquid equaling the height of liquid in said filler neck.

13. A system for removing vapors from a liquid storage tank movable into varying attitudes comprising substantially upright container means located adjacent at least two corners of the tank, said container means being located above the maximum possible liquid level in the tank when the tank is in a substantially level attitude, conduit means connecting the front container means with the rear interior of the tank, conduit means connecting the rear container means with the front interior of the tank, and passage means connecting the upper portions of said container means with a vapor consuming means.

14. The system of claim 13 comprising a valve means coupled into said passage means, said valve means including a first check valve permitting atmospheric air to enter the container means but preventing vapors from escaping to the atmosphere, and a second check valve permitting vapor flow from the container means but preventing flow into the container means.

15. The system of claim 14 in which the valve means contains a third check valve venting the container means to the atmosphere, said third check valve being set to open at a pressure differential exceeding the pressure differential opening said second check valve.